Dec. 11, 1945.        G. A. MOORE        2,390,550
APPARATUS FOR SEALING CONTAINERS
Filed Aug. 4, 1941
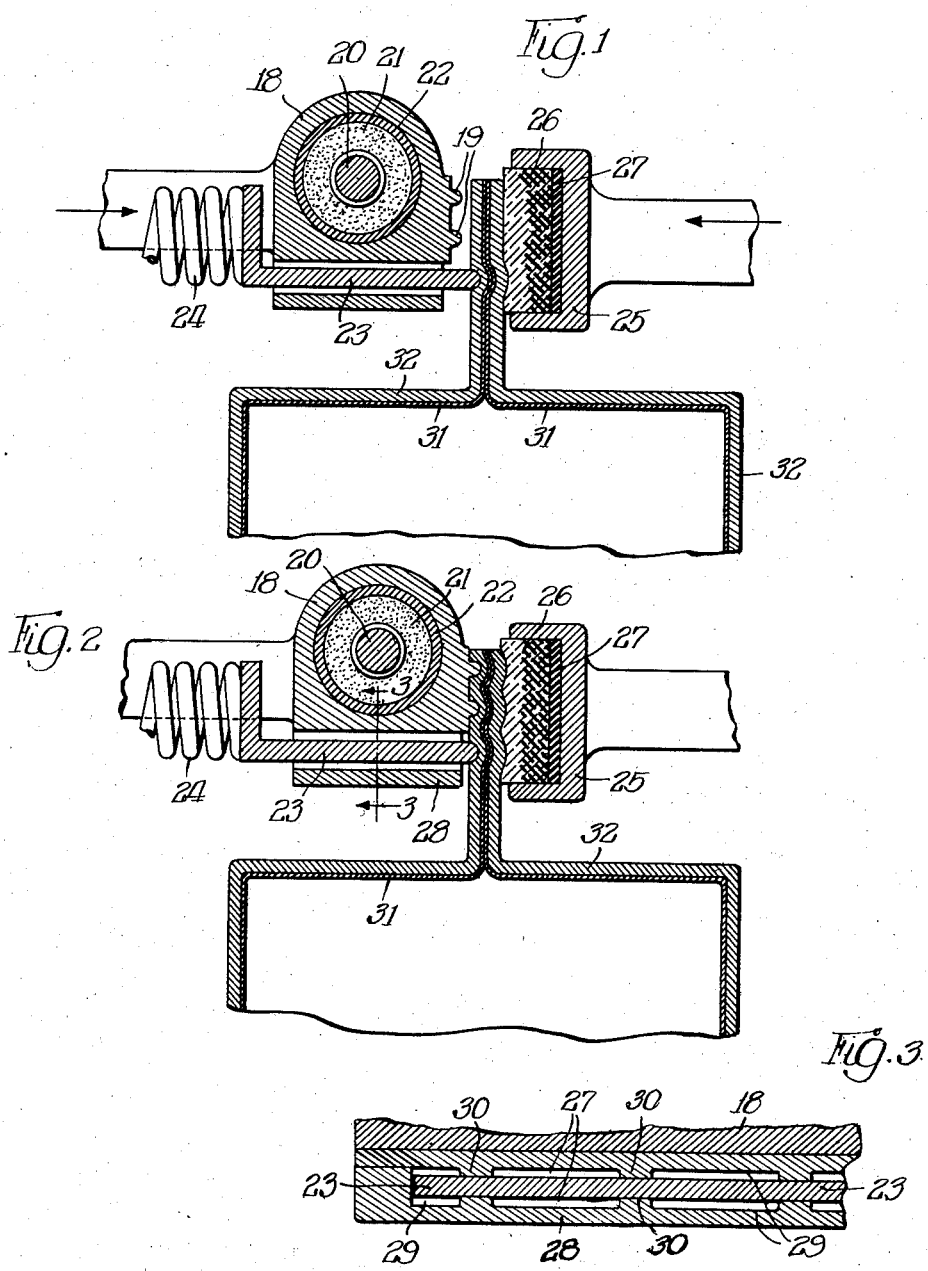
INVENTOR.
George Arlington Moore,
BY
ATTORNEYS.

Patented Dec. 11, 1945

2,390,550

UNITED STATES PATENT OFFICE 2,390,550

APPARATUS FOR SEALING CONTAINERS

George Arlington Moore, New York, N. Y., assignor to Shellmar Products Company, Mount Vernon, Ohio, a corporation of Delaware Application August 4, 1941, Serial No. 405,436

1 Claim. (Cl. 154—42)

The present invention relates to improvements in the container art and pertains more particularly to methods and devices for effecting a compound seal in flexible containers utilizing materials having thermoplastic adhesive properties.

It has been the custom to construct and fabricate such flexible containers from a wide variety of materials, usually by first laminating a sheet of thermoplastic adhesive material to an outer protective sheet of other fibrous material or web of foil. In developing these webs or blanks of laminated material into container form the web of thermoplastic adhesive material always constitutes the inside of the container. Such material is ideally suited for container construction because it serves at least a dual purpose. In addition to the fact that it can be in such combinations that it is gas-impervious, it lends itself readily to activation to form an hermetic seal upon the application of heat and pressure.

One form of such thermoplastic adhesive material now extensively used in such lamination is a chlorinated rubber formulation known to the trade as "Pliofilm," which is generally used as the laminating pellicle for such flexible containers as above indicated. When Pliofilm is subjected to certain temperatures there are given off gases which are the volatile matter inherently contained with it. Certain products or commodities, such as foodstuffs, are very sensitive to certain such gases and may easily be contaminated thereby during the seam-forming operations on the containers. This same condition of the evolution of obnoxious gases is largely true of the general run of heat-activated adhesives such as, for example, certain types of lacquers which contain such constituents as cellulose nitrate, Bakelite resin, tricresyl phosphate, methyl acetone, ethyl acetate, alcohol and toluol. The damaging effect which such materials can have by their evolution of obnoxious gases on food products when high temperatures are applied in the sealing operation can readily be appreciated.

Heretofore, in order to activate the adhesive film disposed on the engaging surfaces or the overlapping ends of blanks to be formed into containers, the lapped portions were engaged and pressed together by a sealing iron. Such an iron may be heated in any suitable manner, electrically or otherwise. A conventional form of sealing iron consists of a male portion having upraised surfaces acting as a die or impression member and another member, the female or anvil portion adapted to receive the male die portion with the container material to be sealed, disposed therebetween. Upon the application of pressure and high temperature these two members are brought together and a seal is effected upon the container. In actual practice I have found that the temperatures required to activate seams in Pliofilm and other thermoplastic heat-sealing lacquers is about 340°. In such sealing operations, heat, pressure and time are prime requisites in the formation of seams. In automatic machinery the more rapidly containers are fabricated the more heat is required and more pressure is necessary. Consequently, sealing time becomes of the essence. Therefore, in the average case, the actual heating time for activating the seam may be one-sixth of a second. This then requires a temperature of approximately 360° F. to 400° F. and a pressure which approaches 20 pounds per square inch or more.

Seams formed in flexible containers must be made invulnerable to all general handling, both in the operations of packing, shipping and consumer service. Therefore, they must be strong enough to withstand the ravages of such conditions including severe shock, varying conditions of climatic changes and any other factors which might contribute to their disintegration. The mere application of low temperature and relatively low pressure are inadequate solutions to the problem here presented of blocking out gases because a seal formed in such manner would not be an hermetic seal which could be depended upon and the conditions heretofore outlined with which such container construction must cope would be too severe successfully to be overcome. Furthermore, some products or commodities require an evacuation process and when containers are used for this purpose the interior of the container can be subjected very close to absolute pressure. This extreme rarefaction aggravates the possible contamination of commodities within the container since the expansion of the gases into the commodity during the seaming operation is extreme.

Generally, it is an object of the invention to provide a method of sealing and a device for accomplishing the same whereby all and more of the benefits of the previous hermetic type of seal can be obtained by heat-sealing the seam under temperatures as great as or in excess of the conditions heretofore prevailing with a consequent sturdy container construction of enhanced characteristics while preventing the influx into the container of obnoxious gases inevitably resulting from high temperatures and accompanying heat-sealing of thermoplastic materials as in the ordinary manner.

More specifically, a principal object of the present invention is the provision of a means and method of sealing flexible containers having thermoplastic adhesive properties by effecting a primary blockoff seam to materially reduce or prevent the injection into the packaged commodity of obnoxious gases and then substantially simultaneously bringing about a final seal under increased conditions of temperature and pressure.

A further object of the present invention is to provide means and method for sealing such a container by minimizing and substantially eliminating the volatilization and obnoxious gaseous vapors from being injected into the container before subjecting the same to the final sealing operation.

Still another object of the present invention is the provision of a heat-sealing device having a compound sealing unit adapted to effect at least one primary sealing operation and at least one final sealing operation.

Other objects of the invention will in part be obvious and will in part appear hereinafter.

The invention accordingly comprises the several steps and the relation of one or more of such steps with respect to each of the others, and a device embodying features of construction, combinations of elements and arrangement of parts which are adapted to effect such steps, all as exemplified in the following detailed disclosure, and the scope of the application which will be indicated in the claim.

For a fuller understanding of the nature and objects of the invention, reference should be had to the following detailed description taken in connection with the accompanying drawing, in which:

Fig. 1 is a side elevational view, partly in section and with parts broken away, depicting a compound sealing device effecting a preliminary seal upon a container extension closure;

Fig. 2 is a view similar to Fig. 1 illustrating a further operational step of the device wherein a secondary sealing application is being made to complete the closure;

Fig. 3 is a cross-sectional view of a fragment of the primary sealing iron shown in Fig. 2 taken along the lines 3—3 and looking in the direction of the arrows.

Briefly, the invention contemplates a preliminary seal wherein the temperature is considerably reduced, by way of an example, in the neighborhood of about 250° F. to 280° F. with about 50 to 75 per cent of the pressure required and which is followed by a secondary or final sealing operation almost simultaneously thereafter under increased conditions of temperature approaching the neighborhood of 400° F. and under maximum pressure required. Thus, under greatly reduced temperature, the heat imparted to the material is of such low order that it greatly reduces the generation of undesirable and obnoxious gases which might otherwise ultimately find access into the container. Hence, having established a primary seal to block off these obnoxious gases the secondary or final sealing operation may be accompanied by temperature and pressure of an increased nature not heretofore permissible, due to the danger of gas contamination of the commodity.

Referring more particularly to Fig. 1 of the drawing, there is shown a preferred form of the invention for effecting the compound seal. A male member or secondary sealing iron 18 constitutes one portion of the compound sealing unit and has a die surface with integral protuberances 19. Mounted within the sealing iron is a heating core 20 surrounded by a magnesium insulator 21 which in turn is surrounded by a metallic casing 22 fitted within the iron 18. Cooperatively associated with the secondary sealing iron is a preliminary heat-sealing blade or iron 23 resiliently mounted against any suitable resilient means such as, for example, a spring 24. The other member of the device is the anvil 25 having a female form of die member which comprises a fabricated rubberized material 26 backed by clear rubber 27. Such material is a very good insulator and will not unduly rob the seam of heat units. The anvil itself is fixedly mounted but while the rubberized surface has motion with each operational cycle it rests against the seam immovable, except for the resilient nature of the material contacting the seam.

In order to insure a sufficiently low degree of heat without impairing the sealing function of the preliminary sealing blade, it is preferably constructed as more particularly shown in Fig. 3 in which there is illustrated a surrounding wall 28 of similar or other suitable material having air pockets 29 at spaced intervals above and below the sealing blade 23. These air pockets are formed by suitable bulk heads or partitions 30 and the resulting air chambers which are formed are open at each end and form ideal insulating chambers to reduce considerably the temperature to the required degree.

After a blank of material such as hereinbefore described has been formed into the shape of a container those portions which are to be hermetically sealed are brought between the male and female members of the sealing device. In Figs. 1 and 2 there is shown such a construction illustrating the container wherein the inner layer 31 comprises the thermoplastic adhesive sheet or web and the outer protective layer 32 forming the other sheet of the laminated material.

In operation, after the container has been formed to the stage shown in Fig. 1, the sealing device is brought into position. The end extension of the container is held in vertical position by resting against the anvil and the primary heat-sealing blade 23 is brought against the seam to effect an initial seal. The pressure has been minimized because of the resilient nature of the spring 24 and the temperature being considerably reduced the gases which have been generated and might find their way into the container by puffing are substantially eliminated. Almost simultaneously, but by a time delayed action, the secondary sealing iron 18 of the compound sealing iron unit is brought into position to effect the secondary or final seal. The sealing shock of both these operations is absorbed by the resilient nature of the female surfaced portion of the anvil 25 and although the heat and pressure upon the second sealing operation have been greatly increased over that effected by the primary seal and even over that effected in conventional sealing devices the effects thereof are readily absorbed by the resilient nature of the female member without danger of breaking or blistering the resulting seam.

In actual practice the formation of the seam as shown against the female members has proven very practical for seam formation and adequately takes care of irregular thicknesses as well as varying multiplicities of thicknesses. Thus, sensitive commodities can be packed in flexible hermetically sealed containers without being materially or significantly contaminated by the formation of contaminating gases formed during the stages of sealing the containers. It can be seen that these principles can be utilized with great merit in fabricating containers where a commodity is to be evacuated as heretofore indicated and whereby the primary sealing means, aside from minimizing the contamination of the product by obnoxious gases, can seal the container with greatly condensed mechanisms and can be readily encased in a suitable chamber to retain the vacuum within the container as a first stage of operation until the container is moved against a larger sealing mechanism.

It will thus be seen that the objects hereinbefore set forth may be readily and efficiently attained and since certain changes in carrying out the above method and in the construction set forth which embody the invention may be made without departing from its scope, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention, which, as a matter of language, might be said to fall therebetween.

Having described my invention, what I claim as new and desire to secure by Letters Patent is:

In a heat-sealing device for hermetically sealing together opposed thermoplastic faces of container openings after said containers have been filled with a food product, or the like, the improvement comprising a sealing mechanism including at least two sealing irons, one of which is a final sealing iron and the other of which is an initial sealing iron resiliently mounted at one of its ends to said final sealing iron and adapted to operate in advance thereof, each of said irons thus being cooperatively connected to each other to function in succession, the final sealing iron operating substantially immediately after the initial sealing iron thereby to provide initial and final seals for said container opening, the other end of the initial sealing iron being slidably mounted within a portion of said final sealing iron and in contact therewith at spaced apart intervals to provide fluid cooling chambers for said initial sealing iron, said final sealing iron being adapted to be heated for high temperature sealing operation, and the initial sealing iron being adapted to be heated by association with the final sealing iron.

GEORGE ARLINGTON MOORE.